(12) United States Patent  (10) Patent No.: US 9,424,536 B2
Bear et al.  (45) Date of Patent: Aug. 23, 2016

(54) SYSTEM FOR BUSINESS PORTFOLIO MODELING AND ANALYSIS

(75) Inventors: Mary E. G. Bear, Burlingame, CA (US); Amy Christine Wilson, Oakland, CA (US); Prashant Singh, Burlington, MA (US); Hugh Zhang, Medford, MA (US); Brendon Glazer, Everett, MA (US)

(73) Assignee: Oracle International Corporation, Redwood Shores, CA (US)

( * ) Notice: Subject to any disclaimer, the term of this patent is extended or adjusted under 35 U.S.C. 154(b) by 333 days.

(21) Appl. No.: 13/149,604

(22) Filed: May 31, 2011

(65) Prior Publication Data

US 2012/0311497 A1  Dec. 6, 2012

(51) Int. Cl.
*G06Q 10/00* (2012.01)
*G06Q 40/00* (2012.01)
*G06F 3/0488* (2013.01)
*G06F 3/0484* (2013.01)

(52) U.S. Cl.
CPC .............. *G06Q 10/00* (2013.01); *G06F 3/0488* (2013.01); *G06F 3/04842* (2013.01); *G06Q 40/00* (2013.01)

(58) Field of Classification Search
CPC ...... G06Q 40/00; G06Q 10/00; G06F 3/0481; G06F 3/04842
USPC .......................... 715/823; 705/7.42, 11; 707/5
See application file for complete search history.

(56) References Cited

U.S. PATENT DOCUMENTS

| 5,727,950 | A | 3/1998 | Cook et al. |
| 5,862,223 | A | 1/1999 | Walker et al. |
| 6,507,836 | B1 * | 1/2003 | Nose et al. |
| 6,527,556 | B1 | 3/2003 | Koskinen |
| 6,829,585 | B1 | 12/2004 | Grewal et al. |
| 6,871,195 | B2 | 3/2005 | Ryan et al. |
| 7,120,647 | B2 | 10/2006 | Venkatesh et al. |
| 7,567,262 | B1 * | 7/2009 | Clemens et al. .............. 345/632 |

(Continued)

FOREIGN PATENT DOCUMENTS

WO  WO2010054370 A1  5/2010

OTHER PUBLICATIONS

Microsoft Live Labs Pivot, from Wikipedia obtained at http://en.wikipedia.org/wiki/Microsoft_Live_Labs_Pivot; May 31, 2011; 2 pages.

(Continued)

*Primary Examiner* — Li Sun
(74) *Attorney, Agent, or Firm* — Trellis IP Law Group, PC

(57) ABSTRACT

A system and method for facilitating integrating enterprise data from multiple sources for display via in a common interface. An example method includes displaying, via a first user interface display screen, a first set of one or more personnel icons representative of one or more enterprise personnel, and providing a first user option to select one or more of the personnel icons. A second user interface display screen may be displayed in response to or after selection of one or more of the personnel icons. The second user interface display screen presents a first type of data. The second user interface display screen further provides a second user option to select one or more user interface features associated with the first type of data, and to then trigger display of a third user interface display screen. The third user interface display presents a second type of data that is associated with the first type of data.

17 Claims, 8 Drawing Sheets

(56) References Cited

U.S. PATENT DOCUMENTS

| | | | |
|---|---|---|---|
| 7,769,624 | B1 | 8/2010 | Armentano et al. |
| 2002/0077884 | A1 | 6/2002 | Sketch |
| 2004/0254805 | A1* | 12/2004 | Schwerin-Wenzel et al. ... 705/1 |
| 2005/0065756 | A1 | 3/2005 | Hanaman |
| 2005/0091095 | A1 | 4/2005 | Wilbrink et al. |
| 2005/0159968 | A1* | 7/2005 | Cozzolino .................. 705/1 |
| 2006/0031087 | A1 | 2/2006 | Fox et al. |
| 2007/0271260 | A1 | 11/2007 | Valentino |
| 2008/0114838 | A1 | 5/2008 | Taylor |
| 2008/0244429 | A1* | 10/2008 | Stading ............ G06F 17/30554 715/764 |
| 2009/0099894 | A1* | 4/2009 | Carden et al. ................ 705/8 |
| 2009/0235176 | A1* | 9/2009 | Jayanthi ................ 715/738 |
| 2009/0276297 | A1 | 11/2009 | Ehrler |
| 2010/0005085 | A1* | 1/2010 | Millmore et al. ............. 707/5 |
| 2010/0103779 | A1 | 4/2010 | Kakirde et al. |
| 2010/0114672 | A1* | 5/2010 | Klaus et al. ................ 705/11 |
| 2010/0198659 | A1 | 8/2010 | Meltzer et al. |

OTHER PUBLICATIONS

Business Intelligence, from Wikipedia obtained at http://en.wikipedia.org/wiki/Business_Intelligence; May 31, 2011; 12 pages.

Oracle Fusion Applications—Oracle Fusion Talent Management Overview; Apr. 2011; 9 pages.

iMentor Interactive, obtained at http://www.imentor.org/imentor-interactive; Dec. 9, 2010; 1 page.

National Mentoring Partnership; obtained at http://www.mentoring.ca.gov/pdf/e-mentor_facesheet.pdf; downloaded circa Dec. 9, 2010; 2 pages.

Priest, Curtiss W.; "Building Worldwide Mentoring Tools: Content Analysis of Visited Web Page and Matching"; Aug. 21, 2002; 4 pages.

Taleo Performance—Large Enterprise Employee Performance Management; obtained at http://www.taleo.com/solutions/taleo-enterprise-performance; May 31, 2011; 2 pages.

Blue/360—Help Your Employees Develop More Fully; obtained at http://www.explorance.com/prod_360.asp?gclid=ClzTh660hqkCFQImbAodgR8cpw; May 31, 2011; 1 page.

ProQuest—"Workstream Debuts Next-Generation Talent Management Suite"; Oct. 10, 2007; 4 pages.

Alexander, Ian; "Six Key Steps to Successfully Select and Implement a Performance Management System"; Nov. 5, 2008; 8 pages.

* cited by examiner

SYSTEM FOR BUSINESS PORTFOLIO MODELING AND ANALYSIS

CROSS REFERENCES TO RELATED APPLICATIONS

This application is related to U.S. patent application Ser. No. 13/104,813, entitled STRATEGIC COLLABORATIVE SALES TEAM IDENTIFICATION/CREATION BASED UPON TALENT SCORE, CRM AND INCENTIVE COMPENSATION INSIGHT, filed on May 10, 2011, which is hereby incorporated by reference, as if set forth in full in this specification for all purposes.

BACKGROUND

The present application relates to software and more specifically to systems, user interfaces, and methods for accessing, displaying, organizing, and/or manipulating enterprise data.

Systems and methods for accessing enterprise data are employed in various demanding applications, including Business Intelligence (BI), Incentive Compensation (IC), Customer Relationship Management (CRM), Human Capital Management (HCM), and other Enterprise Resource Planning (ERP) systems.

Effective access to data and accompanying mechanisms for displaying and organizing the data are important for enabling informed enterprise decision making. An enterprise may maintain a broad Information Technology (IT) landscape, wherein different types of data are stored in multiple disparate databases. Accessing the data may require expertise spanning multiple disciplines.

Enterprises may lack highly effective mechanisms for integrating and presenting data from multiple sources in a single Graphical User Interface (GUI). Accordingly, when making important business decisions, businesses often contract experts to prepare specialized reports detailing information relevant to the business decisions. However, preparation of specialized reports can be costly, and the reports may be incomplete.

Accordingly, important business decisions are often made without complete knowledge of factors affecting the business decisions. Critical business decisions can be based upon guesses or gut feelings. Furthermore, important business opportunities, unexplored solutions to problems, or important decision-making options may be overlooked.

SUMMARY

An example method facilitates integrating enterprise data from multiple sources in a common user interface to facilitate informed decision making. The example method includes displaying, via a first user interface display screen, a first set of one or more personnel icons representative of one or more enterprise personnel; providing a first user option to select one or more of the personnel icons, and displaying a second user interface display screen in response thereto. The second user interface display screen presents a first type of data that is associated with one or more selected personnel icons. The second user interface display screen further provides a second user option to select one or more user interface features representative of or associated with the first type of data to trigger display of a third user interface display screen. The third user interface display screen displays a second type of data that is associated with the first type of data.

Hence, in this example embodiment, context or information continuity is maintained between different user interface display screens by combining use of icons representative of persons and the ability to transition between different display screens that display different but related data pertaining to selected personnel icons. This contextual data navigation facilitates obtaining insight information with which to make informed decisions.

In an illustrative embodiment, the example method further includes providing a user option to perform an action affecting or changing enterprise data associated with one or more selected icons. The first type of data includes geographical information. The second user interface display screen includes a map depicting locations of one or more enterprise personnel associated with one or more selected personnel icons in the first user interface display screen.

The third type of data includes hierarchal data displayed via a hierarchy in the third user interface display screen. The hierarchy includes a graphical representation of one or more enterprise personnel associated with the one or more selected personnel icons. The example method further includes providing a user option to apply a color code or pattern code to the hierarchy, wherein the code is based on a metric associated with each person. Each person is associated with the one or more selected personnel icons.

In another example embodiment, the first type of data includes hierarchal data. The second user interface display screen includes a graphical depiction of an enterprise personnel hierarchy or portion thereof. The third type of data includes social network data. The third user interface display screen includes a graphical depiction of social network data indicating one or more social connections between one or more persons represented by the one or more selected personnel icons.

In another example embodiment, the first type of data includes performance data pertaining to one or more enterprise personnel represented by the one or more selected personnel icons. The second type of data that is displayed via the third user interface display screen further includes geographical information depicting sales performance of one or more enterprise personnel by region.

The example method further includes graphically depicting the first set of one or more personnel icons on a grid that includes a first axis and a second axis. The first axis represents a first metric, and wherein the second axis represents a second metric. The first metric and the second metric represent performance data or ratings associated with each enterprise person who associated with a depicted personnel icon. The grid includes plural sections. An additional user option enables a user to expand or magnify a section.

Examples of additional optional steps include providing a third user option to view one or more data trends associated with one or more enterprise personnel who are associated with one or more selected personnel icons; and providing a fourth user option to generate a report that includes information displayed during navigation between the first, second, and/or third user interface display screens.

Hence, certain embodiments discussed herein may provide an interactive view into data, e.g., by enabling a user to control how data is displayed and by enabling a user navigate data and view the data in selected formats, such as via a map view, hierarchy view, performance results view, and so on. Such data-navigation capabilities may facilitate maximizing situational awareness, i.e., decision-related business insight information, that is relevant to a given enterprise decision. Additional user options for performing actions affecting the data may facilitate implementation of decisions made in response to selective viewing of the data.

Hence, certain embodiments discussed herein may provide efficient and effective access to data maintained via multiple sources in enterprise computing environments. Such data-access mechanisms provide an interactive framework to support making informed business decisions.

Conventionally, extensive data mining and preparation of multiple customized reports prepared over time would be needed to support informed decision making. Embodiments discussed herein may provide more timely and complete business insight information while adding flexibility to support changes to underlying data and to implement business decisions by performing associated actions.

A further understanding of the nature and the advantages of particular embodiments disclosed herein may be realized by reference of the remaining portions of the specification and the attached drawings.

DETAILED DESCRIPTION OF EMBODIMENTS

Although the description has been described with respect to particular embodiments thereof, these particular embodiments are merely illustrative, and not restrictive.

For example, while the present application is discussed with respect to systems and methods for facilitating access to and manipulation of enterprise data to facilitate informed decision making, embodiments are not limited thereto. For example, any computing environment, such as those employed in universities, governments, and so on, which rely upon efficiently mining large data stores, may benefit from data navigation, visualization, and manipulation methods disclosed herein.

Furthermore, while various embodiments disclosed herein employ icons representing persons (called personnel icons herein), embodiments are not limited thereto. Similar embodiments, wherein icons represent data objects not pertaining to persons, may be employed without departing from the scope of the present teachings. For example, other types of icons, such as icons representing products, budgets, business teams, business plans, goals, and so on, could be represented as icons that act as starting points for analysis and transitions between display screens.

For the purposes of the present discussion, a personnel icon may be any icon or other user interface feature that is representative of a person or an object associated with or characterizing the person.

An enterprise may be any organization of persons, such as a business, university, government, military, and so on. The terms "organization" and "enterprise" are employed interchangeably herein. A talent management system or application may be any software application or functionality for facilitating selecting, organizing, or managing enterprise personnel or tasks performed thereby. Personnel of an organization may include any persons associated with the organization, such as employees, contractors, board members, and so on.

Enterprise Resource Planning (ERP) software may be any set of computer code that is adapted to facilitate managing resources of an organization. Example resources include Human Resources (HR), financial resources, assets, employees, and so on, of an enterprise. The terms "ERP software" and "ERP application" may be employed interchangeably herein. However, an ERP application may include one or more ERP software modules or components, such as user interface software modules or components. An ERP system may be any infrastructure, i.e., resources, such as hardware and ERP software, used to facilitate managing resources of an organization.

For clarity, certain well-known components, such as hard drives, processors, operating systems, power supplies, and so on, have been omitted from the figures. However, those skilled in the art with access to the present teachings will know which components to implement and how to implement them to meet the needs of a given implementation.

Figure 1:
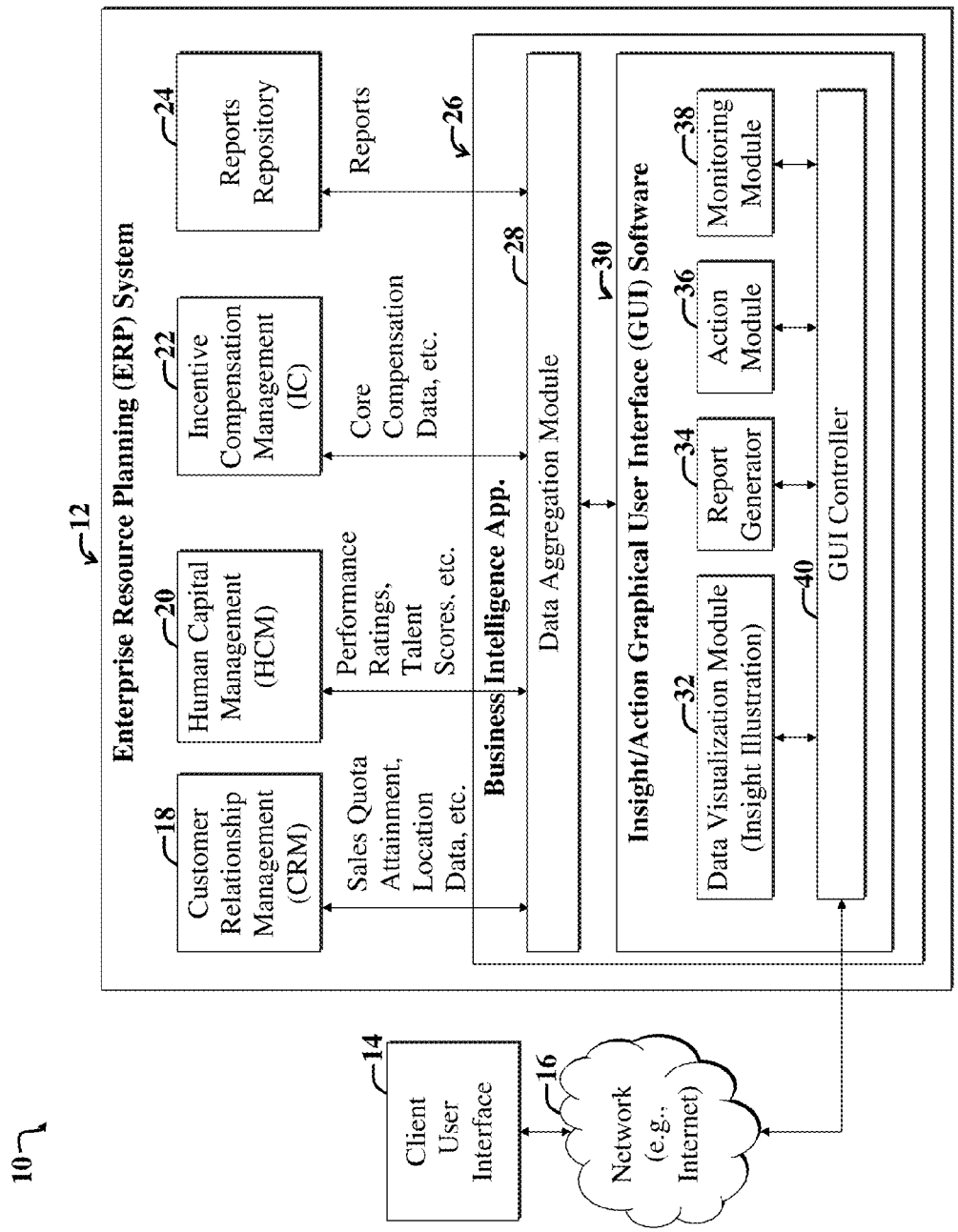
FIG. 1 is a diagram illustrating an example embodiment of an enterprise system including a data-aggregation module for selectively aggregating data from plural sources.

FIG. 1 is a diagram illustrating an example embodiment of an enterprise system 10, which includes an ERP system 12. The ERP system 12 includes a data-aggregation module 28 for selectively aggregating data from plural sources 18-24. A client user interface system 14 includes hardware and software for accessing the ERP system 12 via a network 16, such as the Internet. Note that while a user may access the ERP system 12 via a network, users may also access the ERP system 12 directly, such as via user interface hardware coupled to the GUI 30, without departing from the scope of the present teachings.

The ERP system 12 includes plural data sources 18-24, which include databases for maintaining various types of data. The example data sources 18-24 include a Customer Relationship Management (CRM) system 18, a Human Capital Management (HCM) system 20, an Incentive Compensation (IC) system 22, and a reports repository 24. The data sources 18-24 are linked to a specialized Business Intelligence (BI) application 26, which includes a data aggregation module 28 for selectively retrieving data from or modifying data in the plural sources 18-24 in accordance with commands received from an insight/action Graphical User Interface (GUI) software application 30, as discussed more fully below.

The insight/action GUI software 30 communicates with the data aggregation module 28 and may further communicate with the client user interface 14 via the network 16. The example insight/action GUI software 30 includes a data visualization module 32, a report generator 34, an action module 36, and a monitoring module 38 in communication with a GUI controller 40.

Both the client user interface 14 and the GUI software 30 may include software components for generating display screens, and hardware components, such as monitors, keyboards, and so on, for interacting with user interface software of the client user interface 14.

Note that while various components 12, 14, 18-40 of the enterprise system 10 are represented by separate modules, various modules may be integrated or combined into one or more modules without departing from the scope of the present teachings. Furthermore, the ERP system 12 may be implemented on a single computer system or may be distributed among computing resources of a network.

In an example operative scenario, a user employs the client user interface 14 to interact with the insight/action GUI software 30 over the network 16. The GUI controller 40 receives user commands from the client user interface 14, and adjusts the user interface display screen data in response thereto. The user interface display screen data is forwarded to the client user interface 14 over the network 16 via the GUI controller 40 for display by the client user interface 14. Those skilled in the art with access to the present teachings may readily implement embodiments discussed herein without undue experimentation.

Based on user interaction with the client user interface 14, the controller 40 selectively fetches data from one or more of the data sources 18-24 and incorporates the data into a grid, chart, graph, or other user interface visualization via the data visualization module 32. The type of user interface visualization employed is controllable by input received from the client user interface 14 in response to user interaction therewith, as discussed more fully below. A presented user interface visualization acts as a viewing lens into the data maintained by the data sources 18-24.

For the purposes of the present discussion, a viewing lens may be any user interface display screen that is adapted to display data that has been filtered according to predetermined criteria. For example, a depiction of a map via a user interface display screen, where icons representative of persons are positioned on the map according to their addresses, represents an example viewing lens. The example viewing lens may be called a geographical viewing lens for viewing geographical data, where other types of data, such as sales performance, may be omitted, i.e., filtered from the display.

When the GUI controller 40 detects a command from the client user interface 14 indicative of a particular action request, the GUI controller 40 activates the action module 36 to facilitate changing or manipulating data maintained by one or more of the data sources 18-24 in accordance with the action request or command. The action module 36 may include machine-readable instructions, i.e., computer code, that is adapted to selectively alter or augment data stored via one or more of the data sources 18-24 based on user input from the client user interface 14.

For the purposes of the present discussion, an action may be any computer process or operation on underlying data, or may be another function, such as a navigation function that enables navigating to a different related menu item or user interface display screen.

Examples of actions include, but are not limited to: Human Resources (HR) transactions pertaining to a person or department, e.g., department reorganization, job reassignment, relocation, etc.; talent transactions, such as specification of a successor to a particular employee position; rewards finalization or granting; Customer Relationship Management (CRM) transactions, e.g., pertaining to sales quotas or territories; team creation; Key Performance Indicator (KPI) specification or goal setting; action plan creation and/or assignment; modifications to or creation of compensation plans; budget creation; creation of hiring or organizational plans, and so on.

The GUI controller 40 further includes instructions for interfacing the client user interface 14 with functionality provided by the monitoring module 38. The monitoring module 38 includes computer code for computing trend information based on historical data maintained by one or more of the data sources 18-24. For example, a user may employ the client user interface 14 to activate display of a history of performance ratings for particular enterprise personnel. In accordance with a trend analysis action or command from the user interface client 14, the monitoring module 38 retrieves historical data; calculates one or more trend indicators; and then forwards the result to the data visualization module 32 via the GUI controller 40. The data visualization module 32 then combines the trend data into a visualization, such as a graph, specified by a user who is interacting with the client user interface 14. Data for rendering the visualization is then forwarded to the client user interface 14 for display thereby.

A user may also employ the client user interface 14 and the insight/action GUI software 30 to generate a report based on data presented to the user during a data navigation session. During a particular navigation session, a user may navigate data stored via the data sources 18-24 while applying different visualizations or viewing lenses to the data.

In response to a command or request from the client user interface 14 specifying the generation of a report, computer code running on the GUI controller 40 activates functionality of the report generator module 34. The report generator module 34 may include computer code that is adapted to determine what information the user has navigated, and to assemble a corresponding report in response to the received command or request and the navigated data. The generated report may then be saved in the reports repository 24.

For the purposes of the present discussion, navigation may refer to a transition of a graphical user interface display from a first display of one or more objects to a second display of one or more objects in response to user selection of an object or control in the first display of one or more objects. A user is said to navigate data or to navigate a menu if the user selects one or more different displayed objects or items to activate other objects or items to be displayed.

An object, such as a data object, may be any grouping of or encapsulation of data and/or functionality. Examples of objects include classes or structures implemented via object-oriented programming languages; tables, rows, or records of a database; and so on. A representation of an object, i.e., a displayed object, may be displayed via graphical depiction, such as a menu item, dialog box, personnel icon, and so on. The graphical depiction of an object may also be called an object, a displayed object, or a node.

A visualization may be any graphical presentation of data resulting from an information visualization technique. Information visualization may be any process involving graphically representing data according to a method or scheme. Example visualizations include pie charts, treemaps, bar charts, graphs, and so on.

Figure 2:
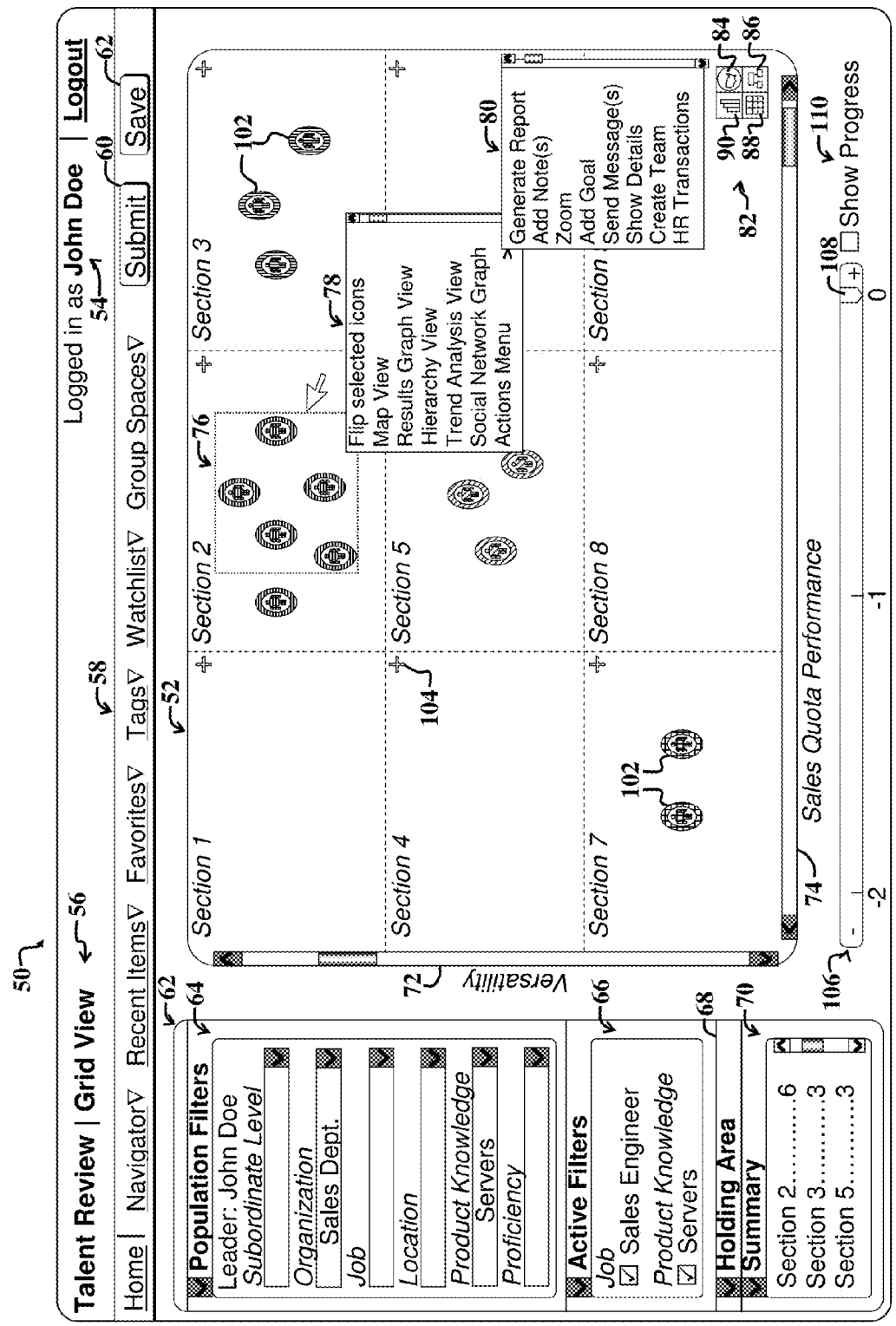
FIG. 2 is a diagram illustrating a first example user interface display screen, which may be generated via the system of FIG. 1 and includes personnel icons.

FIG. 2 is a diagram illustrating a first example user interface display screen 50, which may be generated via the system 10 of FIG. 1 and displayed via the client user interface 14 and/or GUI software 40 of FIG. 1. The user interface display screen 50 includes a breadcrumb band 56 for indicating a user's navigation location among various user interface display screens.

For the purposes of the present discussion, a breadcrumb may be any mechanism for indicating a previously visited and currently visited user interface display screen or menu item. In the present specific embodiment, a particular breadcrumb may act as a menu item upon user selection thereof. For example, a user may select "Talent Review" from the breadcrumb band 56 to access a main talent review screen.

The example user interface display screen 50 further includes a login-indicator section 54, which illustrates, for example, that a user named John Doe is currently logged into the BI application 26 of FIG. 1, which is used to display the screen 50. An optional menu bar 58 provides various additional options for accessing functionality and navigating data. A submit button 60 and a save button 62 are provided for submitting and saving any changes made to the user interface display screen 50, respectively.

A population filter section 62 includes various population filters 64, an active filter section 66, a holding area 68, and a summary section 70. The population filters 64 are adapted to facilitate selecting or filtering personnel icons 102 displayed via a grid 52, as discussed more fully below. A time slider bar 108 is adapted to enable a user to view positions of various personnel icons 102 at different previous times by dragging a slider 108. A show progress control 110 may enable automatic motion of the slider 108 in response to selection thereof, thereby enabling a user to view how personnel icons 102 progress across the grid 52 in time.

Certain user interface features, such as the menu bar 58, population filter section 62, slider bar, and show progress control 110 may operate similarly to corresponding user interface controls discussed more fully in the above-identified co-pending U.S. patent application Ser. No. 13/104,813, entitled STRATEGIC COLLABORATIVE SALES TEAM IDENTIFICATION/CREATION BASED UPON TALENT SCORE, CRM AND INCENTIVE COMPENSATION INSIGHT, filed on May 10, 2011, which is fully incorporated by reference herein.

The example grid 52 includes a vertical axis 72 and a horizontal axis 74, which represent values of a first metric and a second metric, respectively. The vertical axis 72 may represent, for example, a versatility metric associated with each of the plotted personnel icons 102. The horizontal axis 74 may represent, for example, a sales quota performance metric associated with each of the plotted personnel icons 102. Positions of the various personnel icons 102 on the grid 52 are determined according to the values of the first metric and the second metric associated with each of the personnel icons 102. Values of the first metric and the second metric may be included in objects associated with each of the personnel icons 102.

Versatility metrics and sales quota performance metrics represent performance data, also called performance information, associated with the personnel icons 102. For the purposes of the present discussion, performance data may be any information characterizing a performance of enterprise personnel. Additional examples of performance data include, knowledge metrics, reliability ratings, and so on.

A metric may be any measurement, parameter, or other indicator associated with a person or thing. Examples of metrics include sales performance scores, versatility levels, and so on. Versatility of a person may be any measurement quantifying or estimating the person's ability to adapt to various work environments or to accomplish a new set of enterprise objectives or tasks.

The example grid 52 includes nine sections, which may be assigned predetermined names to meet the needs of the present implementation. Note that while nine sections are shown (Section 1 through Section 9), fewer or more sections may be displayed, without departing from the scope of the present teachings.

Each of the nine sections includes a zoom control 104, which enables a user to zoom in on or otherwise expand a particular section in response to selection of the corresponding zoom control 104. Note that while a plus symbol is used to depict the zoom control 104, other symbols may be employed, or the zoom functionality may be activated by merely clicking on a predetermined region (lacking any visible control) of a section.

In the present example embodiment, a user has employed a marquee selection feature to select an example set of personnel icons 76. A user has employed a computer mouse dragged across a region of the grid 52 to select the personnel icons 76. Selection of the personnel icons 76 automatically activates a drop-down menu 78. Alternatively, the drop-down menu 78 may be activated after selection of the personnel icons 76 by activating a button, or by right-clicking a computer mouse. Note that such implementation details are implementation specific and may be altered to meet the needs of a given implementation, without departing from the scope of the present teachings.

The example drop-down menu 78, which is displayed in response to or after selection of the selected personnel icons 76, includes various user interface controls (selection options) for flipping selected icons to view data that appears to be positioned behind the icons; for viewing the icons on a map; for viewing certain statistics or results associated with each icon; for viewing a hierarchy associated with each person represented by one or the selected personnel icons 76; for activating a trend-analysis view for depicting trends of certain metrics associated with each of the selected personnel icons; for viewing a social network graph pertaining to persons represented by the selected personnel icons 76; for activating an actions menu, and so on.

In the present example embodiment, selection of an actions menu option from the drop-down menu 78 triggers display of a sub-menu 80. The sub-menu 80 provides a list of various user selection options for generating reports pertaining to the selected personnel icons 76; adding associated notes; zooming in, expanding, or magnifying selected personnel icons 76; adding goals for persons associated with selected personnel icons 76; sending messages to persons associated with the selected personnel icons 76; showing additional details pertaining to persons associated with the selected personnel icons 76; creating a team of persons associated with the selected personnel icons 76; implementing HR transactions pertaining to persons associated with the selected personnel icons 76, and so on. The actions sub-menu 80 may be scrolled to display additional user interface controls, i.e., selection options.

Note that the various user options illustrated in the drop-down menu 78 and actions sub-menu 80 are merely illustrative. Different, more, or fewer options may be provided to meet the needs of a given implementation, without departing from the scope of the present teachings.

Note that while a marquee select mechanism is discussed herein for selecting personnel icons, other selection methods may be employed, without departing from the scope of the present teachings. In a scenario wherein no personnel icons in the grid 52 are selected, all of the personnel icons 102 may be considered to have been selected. In this case, the drop-down menu 78 may be activated in response to right-clicking a computer mouse or via another mechanism. Furthermore, note that while various user interface controls, i.e., selection options, are provided in the drop-down menu 78 and sub-menu 80, the selection options may be provided via other types of user interface controls, without departing from the scope of the present teachings.

A navigation box 82 provides various user interface controls 84-90 for navigating to different user interface display screens with different viewing lenses, while maintaining data continuity or context between the lenses, as discussed more fully below. The example user interface controls 84-90 include a map view control 84, a hierarchy view control 86, a grid view control 88, and a results graph view control 90. For example, after selection of the personnel icons 77, selection of the grid view control 84 will transition the display screen 50 to a display screen illustrating geographical information associated with the personnel icons 76, as discussed below with reference to FIG. 3.

The grid 52 is said to depict a first type of data associated with the personnel icons 102, including the selected icons 76. The first type of data includes versatility values and sales quota performance values associated with each personnel icon 102, as indicated by the positions of the personnel icons 102. A second type of data, such as geographical information, associated with the selected icons 76 may be displayed in response to selection of one of the controls 84-90 of the navigation box 82. Context between display screens is preserved, since the versatility and sales quota performance information and the subsequently displayed geographical information are all associated with selected personnel icons 76. Hence, certain information continuity or context is maintained between various display screens, i.e., data viewing lenses discussed herein.

For the purposes of the present discussion, geographical information may be any information that is or includes or refers to data that is related to a location or region.

Figure 3:
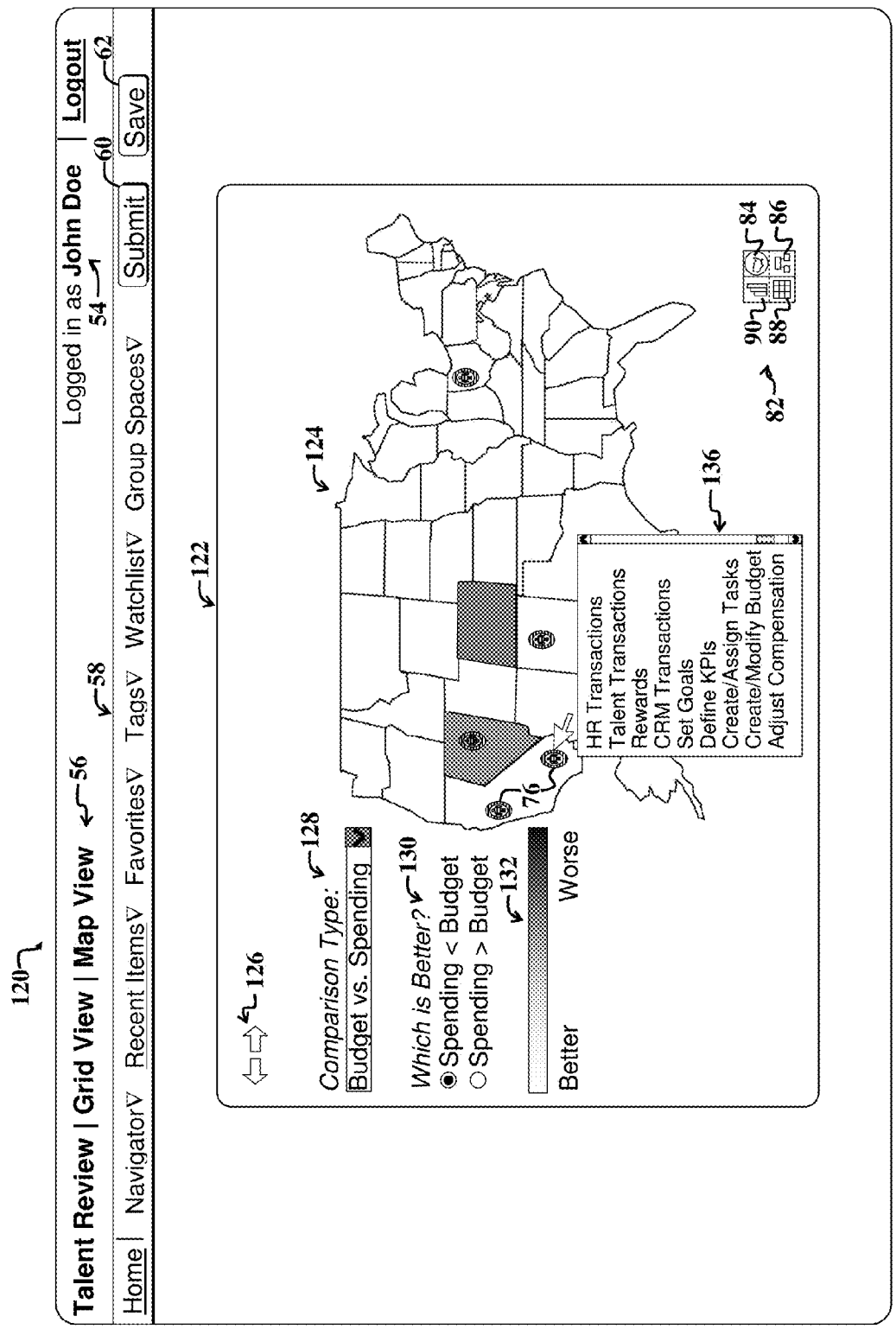
FIG. 3 is a diagram illustrating a second example user interface display screen providing a map view of geographical data associated with personnel icons selected via the user interface display screen of FIG. 2.

FIG. 3 is a diagram illustrating a second example user interface display screen 120, which provides a map view of geographical data associated with the selected personnel icons 76 FIG. 2. In FIG. 3, selected personnel icons 76 have been repositioned on a map 124, where the positions of the selected personnel icons 76 correspond to the address locations of the persons associated with the personnel icons 76.

The second user interface display screen 120 includes a map section 122, which may be displayed, for example, in response to selection of the "Map View" user option from the drop-down menu 78 of FIG. 2, or in response to user selection of the grid view control 84 of the navigation box 82 of FIG. 2.

As discussed with reference to FIG. 2, the personnel icons 76 on the map 124 may be selected, e.g., via a marquee select mechanisms or other selection mechanism, and a subsequent drop-down menu 136 may be activated in response thereto or thereafter. In the present example embodiment, the drop-down menu 136 is similar to the actions drop-down sub-menu 80 of FIG. 2. In FIG. 3, the drop-down menu 136 has been scrolled down to reveal additional example selection options for facilitating initiating actions pertaining to or affecting underlying data.

Various user interface display screens discussed herein, such as the first display screen 50 of FIG. 2 and the second display screen 120 of FIG. 3 are said to facilitate a combination of insight and subsequent action. In FIG. 2, insight is provided by information, such as performance data associated persons who are associated with personnel icons 102, and actions are enabled via one or more user interface controls, such as offered by the drop-down menus 78, 80 of FIG. 2. With reference to FIG. 3, insight is provided by information, such as geographical information associated with each person associated with a displayed personnel icon 76, while subsequent action is enabled via one or more selection options provided by the drop-down menu 136.

Additional insight, which may be considered a type of geographical information, may be provided by selectively coloring or patterning different regions on the map 124 according to a selected metric. For example, the map section 122 of the user interface display screen 120 includes metric-selection controls 128, which enable a user to select a type of metric to display. In the present example embodiment, the selected metric measures budget-versus-spending numbers, also called budget variance metrics.

Patterning options 130 provide options to adjust a pattern or coloring of a region based on the budget-versus-spending metrics associated with different regions. In the present example embodiment, a user has configured the patterning options 130 to display lighter colors for regions where the differences between specified budget levels and corresponding spending levels (i.e., budget minus spending) are greater than corresponding darker areas. The budget-versus-spending metrics may be calculated for an entire enterprise, or alternatively, may be calculated for individual persons corresponding to the displayed personnel icons 76. When the budget-versus-spending metrics are calculated and overlaid on the map 124 for an entire enterprise, the relative positions of the personnel icons 76 provide additional context for making comparisons from which to gather additional insight related to the personnel icons 76.

While the present embodiment illustrates example overlay of budget variance metric values, overlay of other types of information may be implemented. Furthermore, certain sections of a map may be expanded or zoomed in. Additional related map views may be accessed by selecting one or more navigation arrows 126 positioned in the map section 122. For example, a subsequent map view, activated via selection of one of the navigation arrows 126, could illustrate a breakdown of the map 124 by county as opposed to by state, as currently illustrated.

Figure 4:
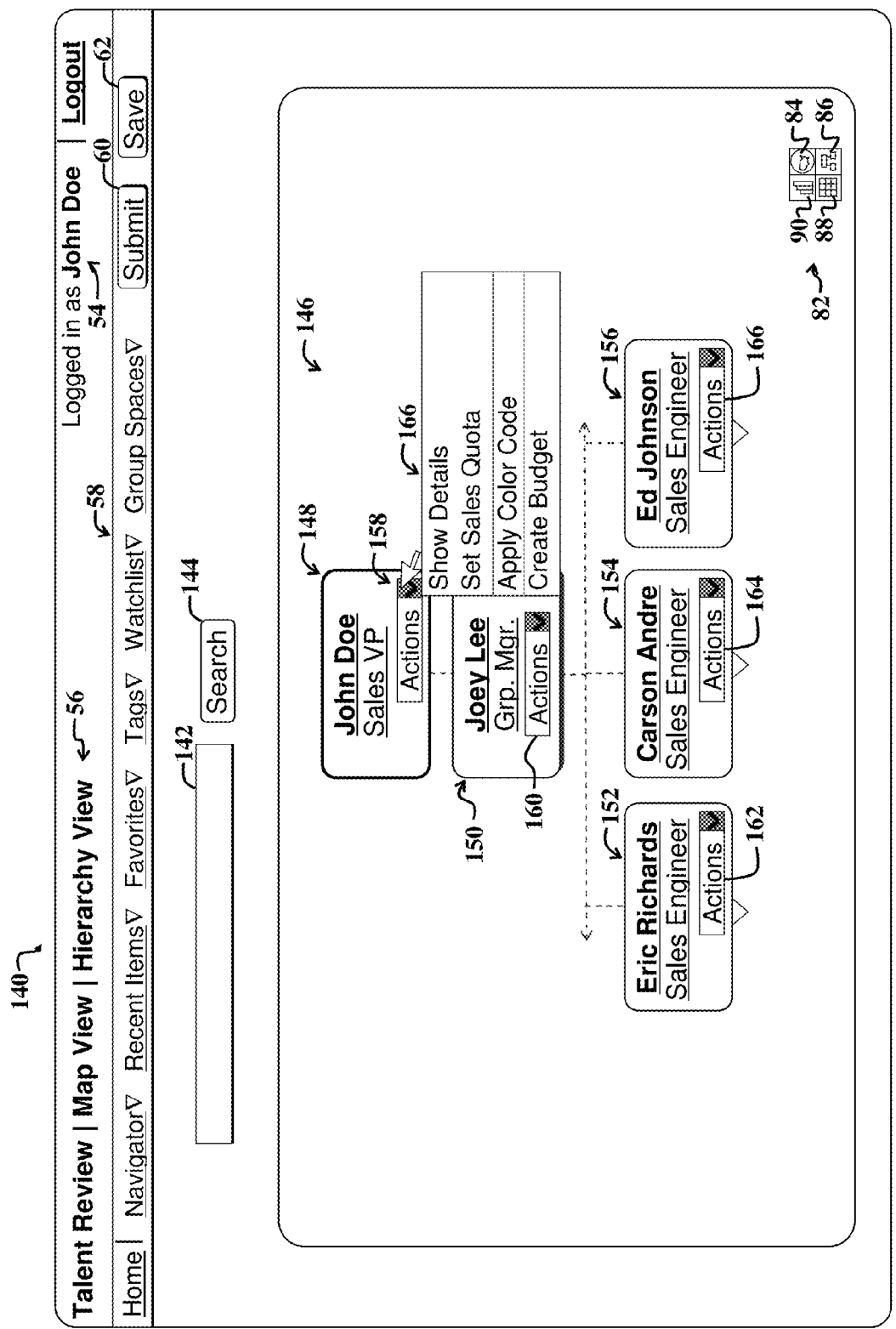
FIG. 4 is a diagram illustrating a third example user interface display screen providing a hierarchal view of hierarchal data associated with personnel icons selected via the user interface display screen of FIG. 2 or via one or more controls of the user interface display screen of FIG. 3.

FIG. 4 is a diagram illustrating a third example user interface display screen 140, which provides a hierarchal view 146 of hierarchal data associated with personnel icons 76 selected via the user interface display screen of FIG. 2 or via the user interface display screen 120 of FIG. 3. The third user interface display screen 140 may appear in response to selection of the hierarchy view control 86 of the navigation box 82 of FIG. 2 or 3.

For the purposes of the present discussion, a hierarchy may be any arrangement of items, e.g., data objects, names, values, categories, and so on. The items may be ordered or positioned such that they exhibit superior or subordinate relationships with related items in a data set. A hierarchy may refer to a displayed representation of data items or may refer to data and accompanying relationships existing irrespective of the representation.

An enterprise personnel hierarchy may be any power structure or depiction thereof of personnel in an organization. The power structure may define powers or privileges of enterprise personnel. Personnel of an organization, i.e., enterprise personnel, may include any persons associated with the organization, such as employees, contractors, board members, and so on. Hierarchal data may be any information characterizing a hierarchy.

The displayed hierarchy 147 depicts five hierarchy nodes 148-156 corresponding to the five selected personnel icons 76 of FIG. 2 or 3. An optional search field 142 and search button 144 enable a user to enter search criteria and trigger a corresponding search of the hierarchy 146 for entered criteria, such as search terms.

The example hierarchy nodes 148-156 include respective actions menus 158-166, which provide various user options to perform actions pertaining to each person associated with the nodes 148-156. Example user options for implementing actions are shown in an action drop-down menu 166 activated in response to user selection of the actions drop-down menu 158 of a first hierarchy node 148. Example user options provided via the drop-down menu 166 include showing additional details associated with the first node 148; setting or adjusting a sales quota for the person associated with the first node 148, applying a color code to the nodes 148-156, creating a budget for the person associated with the first node 148, and so on.

Note that application of a color code to the hierarchy 146 may cause the different nodes 148-156 to appear colored according to values of one or more metrics as specified via a selected coloring scheme. Selection of the "Apply Color Code" user option from the drop-down list 166 may activate an additional user interface display screen with user options for selecting metrics and coloring schemes for application to the hierarchy 146. Note that other types of data overlays or mechanisms for visually distinguishing a node based on a value of a metric associated therewith may be employed. For example, different background patterns, shapes, or sizes may be applied to the nodes 148-156 in accordance with a selected metric and scheme that maps the selected metric values to different patterns, shapes, sizes, etc.

Figure 5:
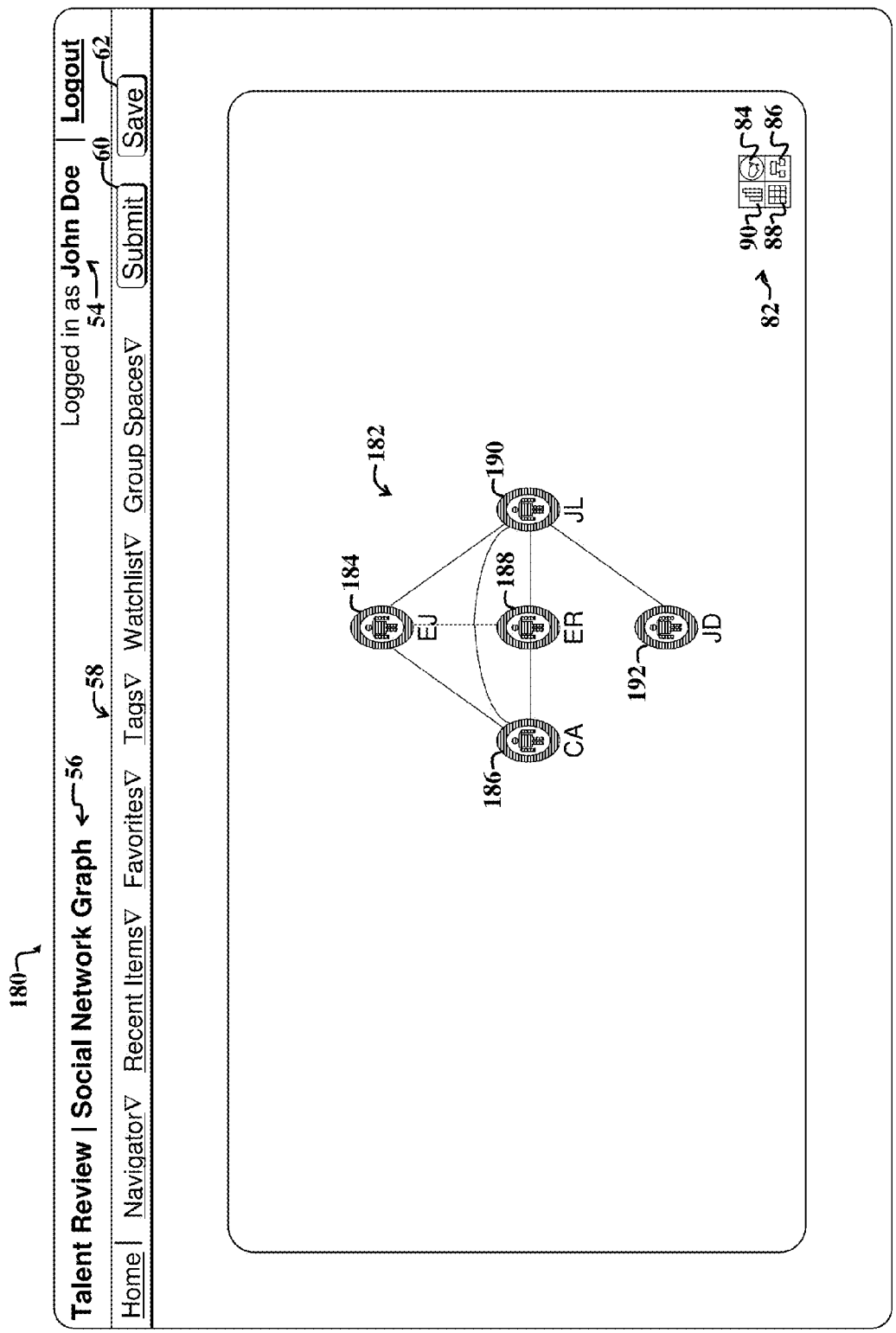
FIG. 5 is a diagram illustrating a fourth example user interface display screen depicting a social network associated with one or more personnel icons selected via the user interface display screen of FIG. 2.

FIG. 5 is a diagram illustrating a fourth example user interface display screen 180 depicting a social network 182 that is associated with one or more personnel icons 184-192 selected via one or more of the user interface display screens of FIG. 2-4. The fourth display screen 180 may be accessed, for example, via selection of the "Social Network Graph" option of the drop-down menu 78 of FIG. 2. Furthermore, a button or control may be added to the navigation box 82 of FIGS. 2-4 to facilitate activating the social network user interface display screen 180.

Various personnel icons 184-192 depicted in the social network 182 are interconnected via lines illustrating social relationships, e.g., friend associations. Note that various additional user interface controls, drop-down menus, and so on, other than those shown in FIG. 5, may be provided without departing from the scope of the present teachings.

The navigation box 82 provides additional controls 84-90 for navigating to or back to a different user interface display screen. Furthermore, note that the breadcrumb bar 56 may be employed in various user interface display screens discussed herein to facilitate navigating between display screens while maintaining context or information continuity or visual continuity.

Figure 6:
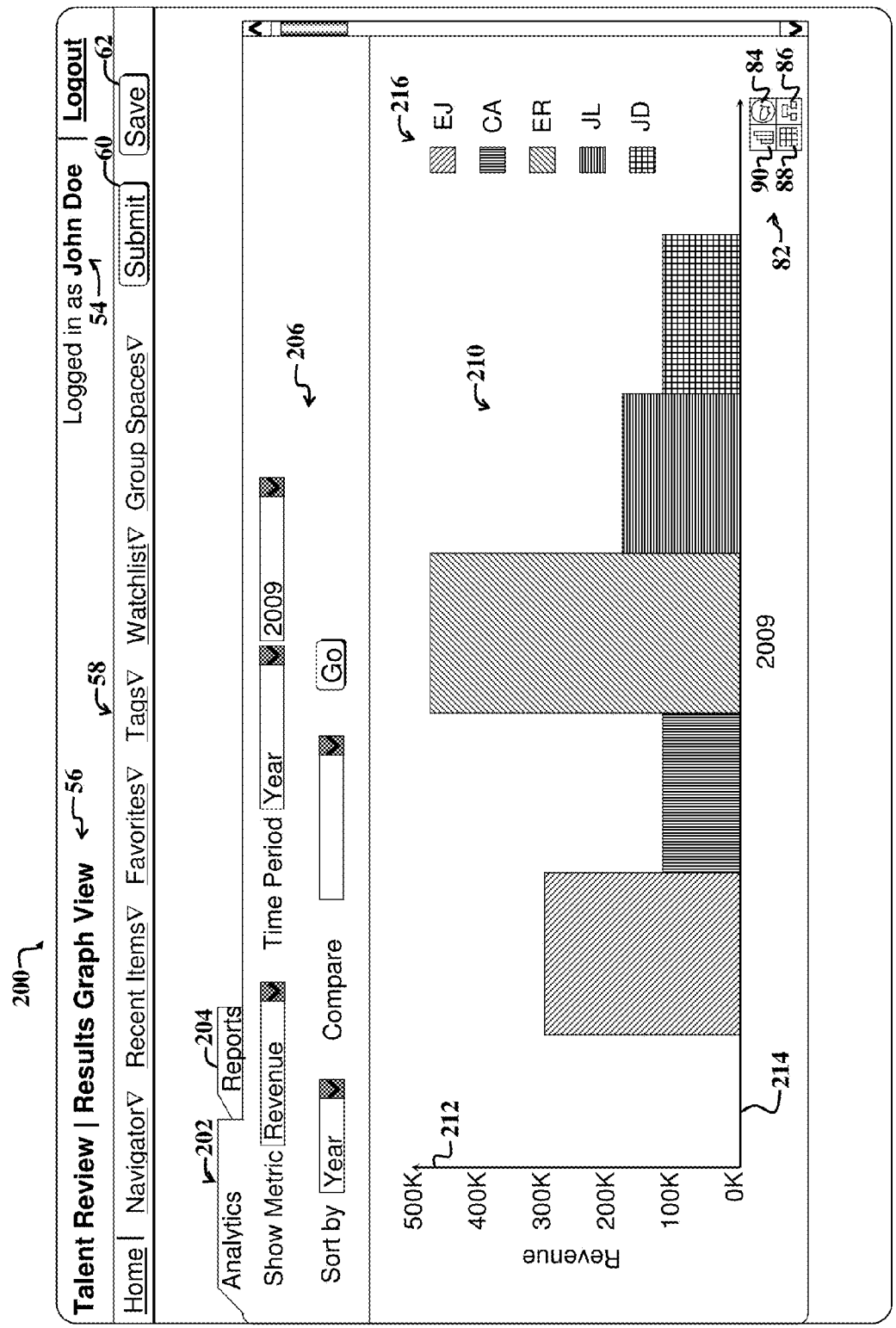
FIG. 6 is a diagram illustrating a fifth example user interface display screen depicting performance results or other data, via a graph, where the data is associated with one or more previously selected personnel icons.

FIG. 6 is a diagram illustrating a fifth example user interface display screen 200, which depicts example performance results or other data, via a graph 210, where the data is associated with one or more previously selected personnel icons. For example, each of the five bars of the graph 210 may indicate revenue generated by each of the five persons associated with the five selected personnel icons 76 of FIG. 2 during a predetermined time interval, such as 2009.

Revenue generated is represented by a vertical axis 212, while the horizontal axis represents the person during 2009. An optional legend 216 indicates which bars of the graph 210 correspond to which persons associated with selected personnel icons, such as the icons 184-192 of FIG. 5.

The graph 210 is provided in an analytics tab 202, which includes additional user interface controls 206 for selectively changing graph parameters to reveal additional insight information. A reports tab 204 may be selected to access various user interface controls for triggering generation of one or more reports.

Figure 7:
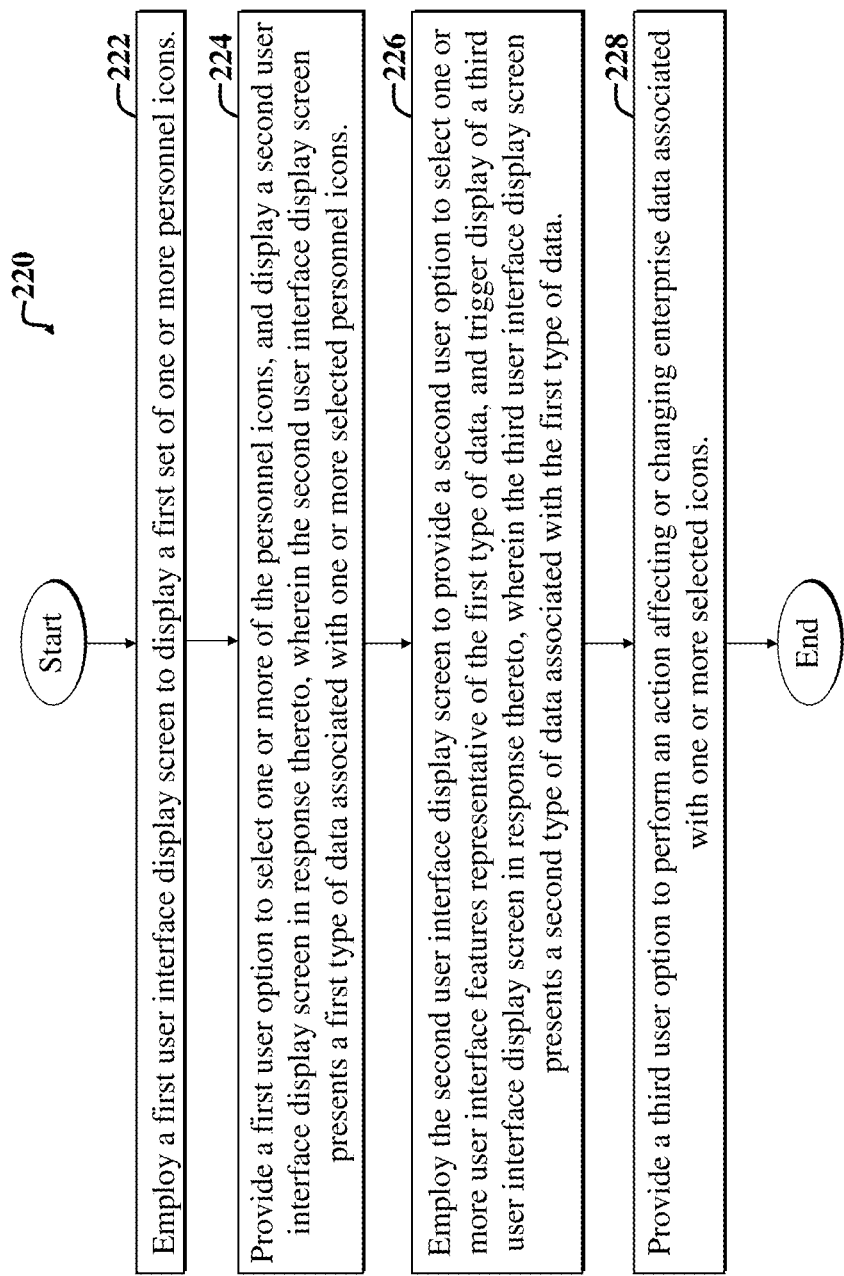
FIG. 7 is a flow diagram of a first example method adapted for use with the embodiments of FIGS. 1-6.

FIG. 7 is a flow diagram of a first example method 220 adapted for use with the embodiments of FIGS. 1-6. The example method 220 is adapted to facilitate access to enterprise data and includes a first step 222, which involves displaying, via a first user interface display screen, a first set of one or more personnel icons representative of one or more enterprise personnel. The first user interface display screen may correspond to, for example, one of the user interface display screens of FIGS. 2-6.

A second step 224 includes providing a first user option to select one or more of the personnel icons and display a second user interface display screen in response thereto, wherein the second user interface display screen presents a first type of data associated with one or more selected personnel icons.

For the purposes of the present discussion, data is said to be associated with a personnel icon if it is part of a data object represented by the icon or is otherwise related, such as via a graphical depiction. For example, in a map that shows sales performance data of a company in combination with personnel icons positioned on the map, the performance data is said to be associated with the displayed personnel icons, whether or not all of the displayed data is directly associated with a particular displayed personnel icon.

The second user interface display screen may correspond to, for example, another one of the user interface display screens of FIGS. 2-6. The first type of data may represent, for example, performance data provided via the grid 52 of FIG. 2.

A third step 226 includes providing a second user option, via the second user interface display screen, to select one or more user interface features representative of the first type of data to trigger display of a third user interface display screen. The third user interface display screen presents a second type of data associated with the first type of data. The one or more user interface features may include, for example the personnel icons of FIGS. 2-6 or navigation controls provided via drop down menus 78, 80 or navigation boxes 82 associated with selected or otherwise displayed personnel icons. The second type of data may refer to, for example, geographical data provided via the second user interface display screen 120 of FIG. 3.

A fourth step 228 includes providing a user option to perform an action affecting or changing enterprise data associated with one or more selected icons. The action may include, for example, setting a sales quota or goal for a person associated with a particular personnel icon.

Note that the method 220 of FIG. 7 may be altered, such as by removing steps, adding steps, interchanging certain steps, and so on, without departing from the scope of the present teachings.

Figure 8:
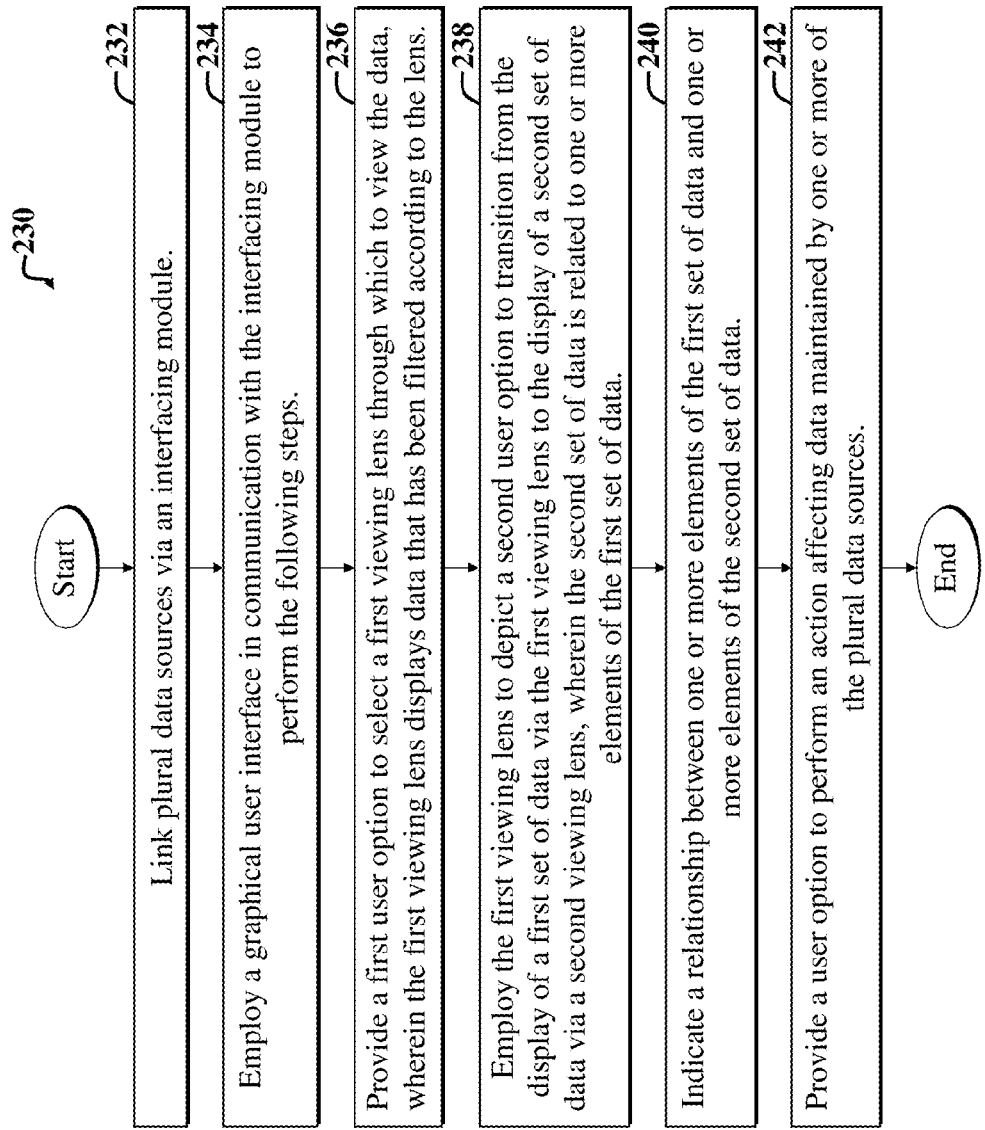
FIG. 8 is a flow diagram of a second example method adapted for use with the embodiments of FIGS. 1-6.

FIG. 8 is a flow diagram of a second example method 230 adapted for use with the embodiments of FIGS. 1-6. The second example method 230 includes a linking step 232, which includes linking plural data sources via an interfacing module, such as the data aggregation module 28 of FIG. 1.

A subsequent GUI step 234 includes employing a graphical user interface in communication with the interfacing module to implement subsequent steps.

The subsequent steps include a first option-providing step 236, which includes providing a first user option to select a first viewing lens through which to view the data. The first viewing lens displays data that has been filtered according to the lens.

A subsequent depicting step 238 includes depicting a second user option, via the first viewing lens, to transition from displaying a first set of data via the first viewing lens to displaying a second set of data via a second viewing lens. The second set of data is related to one or more elements of the first set of data.

Next, an indicating step 240 includes indicating a relationship between one or more elements of the first set of data and one or more elements of the second set of data.

A subsequent providing step 242 includes providing a user option to perform an action affecting data maintained by one or more of the plural data sources.

The method 230 may be modified or altered without departing from the scope of the present teachings. For example, and additional step may be added, which includes employing the first viewing lens to provide a user option to navigate to the second set of data.

Although the description has been described with respect to particular embodiments thereof, these particular embodiments are merely illustrative, and not restrictive.

Any suitable programming language can be used to implement the routines of particular embodiments including C, C++, JAVA®, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method, performed by one or more processors, for modeling enterprise data, the method comprising:

accessing one or more data objects from data objects stored in databases of an enterprise system that manages resources of an organization of an enterprise, wherein the databases include a customer relationship management system, a human capital management system, an incentive compensation system and a reports repository system, and wherein each of the data objects is associated with a plurality of different types of enterprise data;

selecting, in response to user input at a client graphical user interface of an insight and action graphical user interface software, a subset of one or more icons from a larger set of icons, with each icon representing one of the one or more data objects, each of the one or more data objects corresponding to a person in the enterprise;

communicating the selecting between the insight and action graphical user interface software and a data aggregation module via a network, wherein the insight and action graphical user interface software includes a data visualization module, a report generator, an action module, a monitoring module each in communication with a graphical user interface controller;

selectively retrieving data objects that are associated with the subset of the one or more icons from at least one of the databases;

forwarding the retrieved data objects to the client graphical user interface over the network via the graphical user interface controller;

generating user interface display screens displaying the subset of one or more icons using the client graphical user interface and the insight and action graphical user interface software;

depicting a login-indicator section, on at least one of the user interface display screens, indicating a name of a logged in user;

depicting, on at least one of the user interface display screens, a population filter section with respective population filters for further filtering the subset of one or more icons;

depicting, on at least one of the user interface display screens, a time slider bar for viewing positions of the subset of one or more icons at different previous times by dragging a slider associated with the time slider bar;

depicting, on at least one of the user interface display screens, a show progress control, for viewing progress of the subset of one or more icons across a grid in time;

providing icon flip control, on at least one of the user interface display screens, to view data positioned behind a selected icon;

providing a drop-down menu, on at least one of the user interface display screens, with respective options for adding notes, adding goals for a person represented by a selected icon, sending a message to the person represented by the selected icon, showing additional details pertaining to the person represented by the selected icon, and creating a team of people associated with the person represented by the selected icon;

providing a zoom control, on at least one of the user interface display screens, for expanding a specific section of at least one of the user interface display screens;

providing a navigation box, on at least one of the user interface display screens, for navigating between different user interface display screens, wherein the navigation box includes a map view control, a hierarchy view control, a grid view control, a social network view control, and a results graph view control;

in response to a user input signal selecting the map view control from the navigation box to select a first view for the subset of one or more icons, displaying the subset of one or more icons on the client graphical user interface by positioning the subset of one or more icons on the first view with respect to metrics, wherein the displaying of the subset of one or more icons further comprises: incorporating the subset of one or more icons into a user interface visualization via the data visualization module, wherein the user interface visualization acts as a viewing lens into data objects stored in the databases, wherein the viewing lens is selected from a geographical viewing lens with icons representing people positioned on a map according to their respective addresses;

in response to a user input signal selecting another option from the navigation box to select a second view for the subset of one or more icons, activating the action module that manipulates the data objects stored in the databases in accordance with the selected option, and transitioning from displaying the first view to displaying the second view while maintaining information and context continuity between the first view and the second view, the second view including an indicator for each icon in the selected subset of one or more icons, positioning the subset of one or more icons on the second view with respect to metrics, the second view including a second viewing lens displaying a different type of enterprise data that corresponds to the hierarchy view control, the grid view control, the social network view control, or the results graph view control, wherein the first view and the second view each depict the same number of icons that represent the same number of data objects; and displaying respective breadcrumb bands on the first view and the second view corresponding with respective user interface display screens, wherein the breadcrumb bands indicate navigation locations among the respective user interface display screens, and wherein a breadcrumb band acts as a menu item upon user selection.

2. The method of claim 1 wherein the geographical viewing lens includes a geographical map depicting locations of indicators corresponding to each of the icons.

3. The method of claim 2 wherein a talent viewing lens includes a visualization of talent data and displays a talent score of one or more personnel icons populating the subset on a grid that includes a first axis and a second axis.

4. The method of claim 3 wherein the first axis represents a first metric, and wherein the second axis represents a second metric, and wherein the first metric and the second metric represent data or ratings associated with each enterprise person who is associated with a depicted personnel icon.

5. The method of claim 4 wherein the grid includes plural sections, and further including providing a user option to expand or magnify a section.

6. The method of claim 1 wherein an organizational viewing lens includes a visualization of hierarchical data and displays a hierarchy including a graphical representation of indicators corresponding to each of the icons.

7. The method of claim 6 further including providing a user option to apply a color code or pattern code to the hierarchy.

8. The method of claim 6 wherein the organizational viewing lens includes a graphical depiction of an enterprise personnel hierarchy or portion thereof.

9. The method of claim 1 wherein a network viewing lens includes a visualization of network data and includes a graphical depiction of social network data indicating one or more social connections between personnel represented by the one or more icons populating the subset.

10. The method of claim 1 wherein the geographical viewing lens displays geographical information depicting a performance metric associated with one or more indicators corresponding to the one or more icons by region.

11. The method of claim 1 further including:
providing a user option to view one or more data trends associated with one or more enterprise personnel who are associated with the one or more icons.

12. The method of claim 1 further including providing a user option to generate a report that includes information displayed when navigating between the viewing lenses in a plurality of different viewing lenses.

13. The method of claim 1, wherein the first viewing lens includes a first section arrangement and wherein the second viewing lens includes a second section arrangement that is different from the first section arrangement.

14. The method of claim 13, wherein the first section arrangement includes one or more map sections and wherein the second section arrangement includes one or more grid sections.

15. An apparatus for modeling enterprise data, the apparatus comprising:
one or more processors;
non-transitory storage media including one or more instructions for:
accessing one or more data objects from data objects stored in databases of an enterprise system that manages resources of an organization of an enterprise, wherein the databases include a customer relationship management system, a human capital management system, an incentive compensation system and a reports repository system, and wherein each of the data objects is associated with a plurality of different types of enterprise data;
selecting, in response to user input at a client graphical user interface of an insight and action graphical user interface software, a subset of one or more icons from a larger set of icons, with each icon representing one of the one or more data objects, each of the one or more data objects corresponding to a person in the enterprise;
communicating the selecting between the insight and action graphical user interface software and a data aggregation module via a network, wherein the insight and action graphical user interface software includes a data visualization module, a report generator, an action module, a monitoring module each in communication with a graphical user interface controller;
selectively retrieving data objects that are associated with the subset of the one or more icons from at least one of the databases;
forwarding the retrieved data objects to the client graphical user interface over the network via the graphical user interface controller;
generating user interface display screens displaying the subset of one or more icons using the client graphical user interface and the insight and action graphical user interface software;
depicting a login-indicator section, on at least one of the user interface display screens, indicating a name of a logged in user;

depicting, on at least one of the user interface display screens, a population filter section with respective population filters for further filtering the subset of one or more icons;

depicting, on at least one of the user interface display screens, a time slider bar for viewing positions of the subset of one or more icons at different previous times by dragging a slider associated with the time slider bar;

depicting, on at least one of the user interface display screens, a show progress control, for viewing progress of the subset of one or more icons across a grid in time;

providing icon flip control, on at least one of the user interface display screens, to view data positioned behind a selected icon;

providing a drop-down menu, on at least one of the user interface display screens, with respective options for adding notes, adding goals for a person represented by a selected icon, sending a message to the person represented by the selected icon, showing additional details pertaining to the person represented by the selected icon, and creating a team of people associated with the person represented by the selected icon;

providing a zoom control, on at least one of the user interface display screens, for expanding a specific section of at least one of the user interface display screens;

providing a navigation box, on at least one of the user interface display screens, for navigating between different user interface display screens, wherein the navigation box includes a map view control, a hierarchy view control, a grid view control, a social network view control, and a results graph view control;

in response to a user input signal selecting the map view control from the navigation box to select a first view for the subset of one or more icons, displaying the subset of one or more icons on the client graphical user interface by positioning the subset of one or more icons on the first view with respect to metrics, wherein the displaying of the subset of one or more icons further comprises: incorporating the subset of one or more icons into a user interface visualization via the data visualization module, wherein the user interface visualization acts as a viewing lens into data objects stored in the databases, wherein the viewing lens is selected from a geographical viewing lens with icons representing people positioned on a map according to their respective addresses;

in response to a user input signal selecting another option from the navigation box to select a second view for the subset of one or more icons, activating the action module that manipulates the data objects stored in the databases in accordance with the selected option, and transitioning from displaying the first view to displaying the second view while maintaining information and context continuity between the first view and the second view, the second view including an indicator for each icon in the selected subset of one or more icons, positioning the subset of one or more icons on the second view with respect to metrics, the second view including a second viewing lens displaying a different type of enterprise data that corresponds to the hierarchy view control, the grid view control, the social network view control, or the results graph view control, wherein the first view and the second view each depict the same number of icons that represent the same number of data objects; and displaying respective breadcrumb bands on the first view and the second view corresponding with respective user interface display screens, wherein the breadcrumb bands indicate navigation locations among the respective user interface display screens, and wherein a breadcrumb band acts as a menu item upon user selection.

16. Non-transitory storage media including one or more instructions for:

accessing one or more data objects from data objects stored in databases of an enterprise system that manages resources of an organization of an enterprise, wherein the databases include a customer relationship management system, a human capital management system, an incentive compensation system and a reports repository system, and wherein each of the data objects is associated with a plurality of different types of enterprise data;

selecting, in response to user input at a client graphical user interface of an insight and action graphical user interface software, a subset of one or more icons from a larger set of icons, with each icon representing one of the one or more data objects, each of the one or more data objects corresponding to a person in the enterprise;

communicating the selecting between the insight and action graphical user interface software and a data aggregation module via a network, wherein the insight and action graphical user interface software includes a data visualization module, a report generator, an action module, a monitoring module each in communication with a graphical user interface controller;

selectively retrieving data objects that are associated with the subset of the one or more icons from at least one of the databases;

forwarding the retrieved data objects to the client graphical user interface over the network via the graphical user interface controller;

generating user interface display screens displaying the subset of one or more icons using the client graphical user interface and the insight and action graphical user interface software;

depicting a login-indicator section, on at least one of the user interface display screens, indicating a name of a logged in user;

depicting, on at least one of the user interface display screens, a population filter section with respective population filters for further filtering the subset of one or more icons;

depicting, on at least one of the user interface display screens, a time slider bar for viewing positions of the subset of one or more icons at different previous times by dragging a slider associated with the time slider bar;

depicting, on at least one of the user interface display screens, a show progress control, for viewing progress of the subset of one or more icons across a grid in time;

providing icon flip control, on at least one of the user interface display screens, to view data positioned behind a selected icon;

providing a drop-down menu, on at least one of the user interface display screens, with respective options for adding notes, adding goals for a person represented by a selected icon, sending a message to the person represented by the selected icon, showing additional details pertaining to the person represented by the selected icon, and creating a team of people associated with the person represented by the selected icon;

providing a zoom control, on at least one of the user interface display screens, for expanding a specific section of at least one of the user interface display screens;

providing a navigation box, on at least one of the user interface display screens, for navigating between different user interface display screens, wherein the navigation box includes a map view control, a hierarchy view control, a grid view control, a social network view control, and a results graph view control;

in response to a user input signal selecting the map view control from the navigation box to select a first view for the subset of one or more icons, displaying the subset of one or more icons on the client graphical user interface by positioning the subset of one or more icons on the first view with respect to metrics, wherein the displaying of the subset of one or more icons further comprises: incorporating the subset of one or more icons into a user interface visualization via the data visualization module, wherein the user interface visualization acts as a viewing lens into data objects stored in the databases, wherein the viewing lens is selected from a geographical viewing lens with icons representing people positioned on a map according to their respective addresses;

in response to a user input signal selecting another option from the navigation box to select a second view for the subset of one or more icons, activating the action module that manipulates the data objects stored in the databases in accordance with the selected option, and transitioning from displaying the first view to displaying the second view while maintaining information and context continuity between the first view and the second view, the second view including an indicator for each icon in the selected subset of one or more icons, positioning the subset of one or more icons on the second view with respect to metrics, the second view including a second viewing lens displaying a different type of enterprise data that corresponds to the hierarchy view control, the grid view control, the social network view control, or the results graph view control, wherein the first view and the second view each depict the same number of icons that represent the same number of data objects; and displaying respective breadcrumb bands on the first view and the second view corresponding with respective user interface display screens, wherein the breadcrumb bands indicate navigation locations among the respective user interface display screens, and wherein a breadcrumb band acts as a menu item upon user selection.

17. The non-transitory storage media as recited in claim 16, wherein the instructions for the accessing the one or more data objects further include one or more instructions for obtaining all of the information only from within the enterprise system that manages resources of the organization.

* * * * *